US010137857B1

(12) United States Patent
Siddiqui et al.

(10) Patent No.: US 10,137,857 B1
(45) Date of Patent: Nov. 27, 2018

(54) VEHICLE UNLOCKING SYSTEMS, DEVICES, AND METHODS

(71) Applicant: Ford Global Technologies, LLC, Dearborn, MI (US)

(72) Inventors: Adil Nizam Siddiqui, Farmington Hills, MI (US); Jonathan Diedrich, Carleton, MI (US); Ali Hassani, Ann Arbor, MI (US); Laura Viviana Hazebrouck, Birmingham, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/683,375

(22) Filed: Aug. 22, 2017

(51) Int. Cl.
| | |
|---|---|
| *G05B 19/00* | (2006.01) |
| *B60R 25/10* | (2013.01) |
| *G05B 23/02* | (2006.01) |
| *G05B 23/00* | (2006.01) |
| *B60Q 1/00* | (2006.01) |
| *H03M 1/00* | (2006.01) |
| *H03M 9/00* | (2006.01) |
| *B60R 25/01* | (2013.01) |
| *B60R 25/23* | (2013.01) |
| *B60R 25/25* | (2013.01) |
| *E05B 85/16* | (2014.01) |

(52) U.S. Cl.
CPC ............ *B60R 25/01* (2013.01); *B60R 25/23* (2013.01); *B60R 25/255* (2013.01); *E05B 85/16* (2013.01)

(58) Field of Classification Search
CPC ........ G05B 19/00; G05B 23/02; G05B 23/00; B60R 25/10; B60Q 1/00; H03M 1/00; H03M 9/00
USPC .. 340/5.83, 3.1, 10.1–10.5, 5.23, 5.26, 5.72, 340/505
See application file for complete search history.

(56) References Cited

U.S. PATENT DOCUMENTS

| | | | | |
|---|---|---|---|---|
| 6,031,465 | A * | 2/2000 | Burgess | G07C 9/00182 340/426.36 |
| 6,323,761 | B1 | 11/2001 | Son | |
| 7,034,655 | B2 * | 4/2006 | Magner | G07C 9/00674 307/10.4 |
| 7,255,466 | B2 * | 8/2007 | Schmidt | G07C 9/0069 200/314 |
| 7,417,681 | B2 * | 8/2008 | Lieberman | G06F 1/1626 345/168 |
| 7,637,631 | B2 * | 12/2009 | McDermott | B60R 25/00 362/276 |

(Continued)

FOREIGN PATENT DOCUMENTS

| | | |
|---|---|---|
| DE | 10113950 A1 | 9/2002 |
| EP | 0962894 A2 | 12/1999 |

*Primary Examiner* — Nam V Nguyen
(74) *Attorney, Agent, or Firm* — James P. Muraff; Neal, Gerber & Eisenberg LLP

(57) ABSTRACT

Systems, devices, and methods are disclosed for unlocking a vehicle. An example vehicle includes an ultraviolet keypad coupled to a window. The vehicle also includes a camera directed at the window, configured to capture a key press of the ultraviolet keypad and an iris of a person outside the vehicle. And the vehicle further includes a processor configured to detect the key press and iris, unlock the vehicle based on the detected key press, and modify a vehicle setting based on a profile corresponding to the detected iris.

20 Claims, 6 Drawing Sheets

(56) References Cited

U.S. PATENT DOCUMENTS

| | | | | |
|---|---|---|---|---|
| 8,640,946 B1* | 2/2014 | Block | ............... | G06Q 20/1085 |
| | | | | 235/379 |
| 8,643,481 B2* | 2/2014 | Campbell | ............... | B60R 1/12 |
| | | | | 340/438 |
| 8,937,528 B2 | 1/2015 | Protopapas | | |
| 8,994,495 B2 | 3/2015 | Dassanayake et al. | | |
| 9,150,123 B2* | 10/2015 | Jendritza | ............... | B60N 2/002 |
| 9,518,408 B1 | 12/2016 | Krishnan | | |
| 9,563,998 B2* | 2/2017 | Hoyos | ............... | G07C 9/00563 |
| 9,707,912 B1* | 7/2017 | Pena Casimiro | .. | G06K 9/00288 |
| 9,783,162 B2* | 10/2017 | Hoyos | ............... | B60R 25/25 |
| 9,848,113 B2* | 12/2017 | Smits | ............... | H04N 5/2258 |
| 2006/0056663 A1 | 3/2006 | Call | | |
| 2006/0145825 A1* | 7/2006 | McCall | ............... | B60R 25/2045 |
| | | | | 340/426.35 |
| 2006/0261272 A1* | 11/2006 | Yoshida | ............... | B60R 25/1004 |
| | | | | 250/330 |
| 2014/0200737 A1* | 7/2014 | Lortz | ............... | B60R 25/25 |
| | | | | 701/1 |
| 2015/0009010 A1* | 1/2015 | Biemer | ............... | G06F 21/32 |
| | | | | 340/5.83 |
| 2015/0098630 A1* | 4/2015 | Perna | ............... | G06K 9/00604 |
| | | | | 382/117 |
| 2016/0260206 A1* | 9/2016 | Jung | ............... | G06K 9/00597 |
| 2016/0300410 A1* | 10/2016 | Jones | ............... | G06K 9/00288 |

\* cited by examiner

VEHICLE UNLOCKING SYSTEMS, DEVICES, AND METHODS

TECHNICAL FIELD

The present disclosure generally relates to vehicle unlocking systems, devices, and methods and, more specifically, using the same camera for both driver identity matching and detecting key presses on an ultraviolet keypad displayed in the vehicle window.

BACKGROUND

A typical vehicle may be unlocked with a key. Alternatively, the vehicle may be unlocked without a key, if the driver enters a predetermined key code sequence via an input on the vehicle exterior.

Vehicles may also include one or more settings that are customizable, such as seat position, default operation mode, audio presets, and more. These settings may change based on the identity of the driver.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for remote vehicle unlocking systems, devices, and methods. An example disclosed vehicle includes an ultraviolet ink keypad coupled to a window, and a camera directed at the window, configured to capture a key press on the ultraviolet keypad and an iris of a person outside the vehicle. The vehicle also includes a processor configured to detect the key press and iris. The processor is also configured to unlock the vehicle based on the detected key press. The processor is further configured to modify a vehicle setting based on a profile corresponding to the detected iris.

An example disclosed method includes capturing, by a camera of a vehicle, a key press on an ultraviolet keypad coupled to a vehicle window. The method also includes capturing, by the camera, an iris of a person outside the vehicle window. The method further includes detecting, by a vehicle processor, the key press and the iris. The method still further includes unlocking the vehicle based on the detected key press. And the method yet further includes modifying a vehicle setting based on a profile corresponding to the detected iris.

Another example may include means for capturing, by a camera of a vehicle, a key press on an ultraviolet keypad coupled to a vehicle window. The example may also include means for capturing, by the camera, an iris of a person outside the vehicle window. The example may further include means for detecting, by a vehicle processor, the key press and the iris. The example may still further include means for unlocking the vehicle based on the detected key press. And the example may yet further include means for modifying a vehicle setting based on a profile corresponding to the detected iris.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
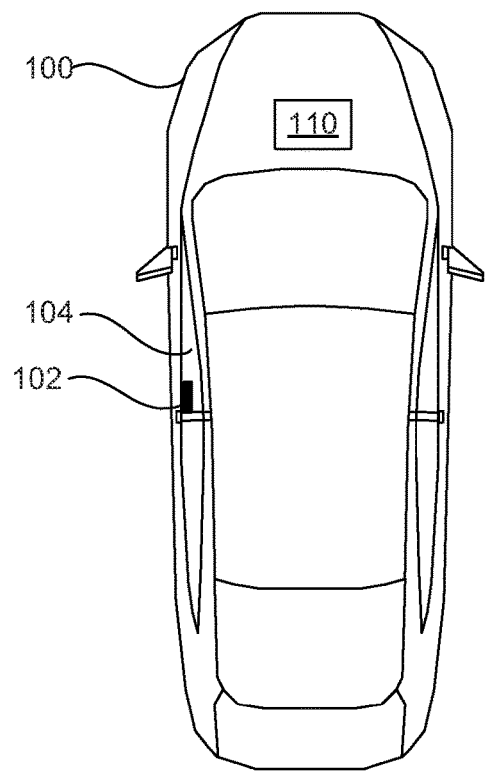
FIGS. 1A and 1B illustrate overhead and side perspective views of an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, example devices, systems, and methods disclosed herein relate to identifying a vehicle driver and enabling the driver to unlock a vehicle, using the same camera for both purposes. Vehicles may include technology that enables the vehicle to identify the driver or one or more other occupants in a secure manner, using biometric data such a fingerprint. This data can be used to unlock the vehicle and/or change one or more settings of the vehicle, to personalize the vehicle for the particular person identified. But fingerprint sensors can result in false positives, may not be accurate, and can cause increased costs and difficulty in manufacturing.

Vehicles may also include key pads or number pads on the vehicle door or applique, enabling a driver to unlock the vehicle using a simple numeric code. These vehicles enable a driver to unlock the vehicle without the use of a key. This allows the user to unlock the vehicle in the event the key is locked inside, is lost, or is otherwise unavailable to the driver.

Example embodiments disclosed herein may make use of a single camera for the purpose of detecting key presses on the vehicle window, as well as identifying the person outside the vehicle based on a detected iris. Iris recognition may be more secure than a fingerprint, reducing the likelihood of false positives and ensuring that only authorized people are able to unlock the vehicle.

In order to provide these benefits as well as others, example vehicles disclosed herein may be configured to detect the presence of a person outside the vehicle. This may be done, for example, by detecting a touch on the door handle, using a proximity sensor, detecting the presence of a key fob, smart key, or phone-as-a-key (PaaK) device.

Upon detection of a person outside the vehicle, the vehicle may activate a camera located inside the vehicle, positioned such that the field of view includes the head of the person. The camera may capture images of the person's face, detect an iris of the person's eye, and determine that the iris corresponds to one or more allowed profiles. In some examples, the camera and/or a connected processor may be configured to perform facial recognition (rather than iris recognition). Further, the camera and/or a connected processor may be configured to determine a facial blood flow heart rate signature. And based on the detected face, iris, and/or heart rate signature, may modify or personalize one or more vehicle settings.

Upon determination that the iris (or face) corresponds to an allowed profile, the vehicle may begin modifying one or more vehicle settings. For instance, the profile may have a corresponding seat position, audio presets, or more, that may change based on the identity of the person and/or profile.

In addition, the vehicle may activate one or more LEDs configured to illuminate an ultraviolet (UV) keypad. The UV keypad may include UV absorbent or reflective material positioned between two or more layers of material that make up the window. A driver may then put his or her finger on the keypad to enter the code to unlock the vehicle. The camera may be used to capture light reflected off the driver's finger, such that key presses can be determined. If the correct sequence of key presses is detected by the camera, the vehicle may be unlocked. In some instances, however, the vehicle may also require that the iris detection is performed as well. As such, some vehicles may require both that the iris corresponds to an allowed profile, and that the correct code is input to the UV keypad.

Some examples disclosed herein may relate to situations in which a user has a key fob on their person. The vehicle may be in a welcome mode, in which it is actively or passively searching for the presence of a key fob or phone that functions as a key. The vehicle may detect the key (within a threshold distance, such as 4-5 meters), and may activate the camera to perform personalization. In this example, the UV keypad may not be used for coded entry.

Similarly, where a key (fob or phone) is present but the vehicle is not in the welcome mode, or is not actively or passively searching for the key fob, the vehicle may detect the presence of a person via a touch on a handle of the vehicle. The camera may then be activated to perform facial or iris detection, prior to the vehicle unlocking. After the facial recognition is performed, the vehicle may begin personalizing the vehicle settings. And the vehicle may be unlocked based on a detection of the presence of the key fob.

In the examples described herein, the camera may be activated for facial or iris recognition, in order to personalize the vehicle, prior to unlocking the vehicle via keypad coded entry. This may ensure that the camera is positioned such that it can capture the user's face. If the vehicle was unlocked first, the door may be opened and the camera may be moved out of position. As such, examples disclosed herein may require facial recognition prior to unlocking the vehicle, even where the facial recognition is not used to unlock the vehicle directly (rather the unlocking is done through detection of a key fob or entry of a key code).

Further, some examples may include the use of either or both of facial and iris recognition. Facial recognition may be less secure than iris detection, and may be used only for personalized access (i.e., the presence of a key or entry via a UV keypad may still be required). Iris recognition, however, may be more secure. As such, some examples may include the ability to toggle between using iris recognition for personalized access (i.e., a key or keypad may still be required) or for secure biometric access (i.e., unlocking the door without the use of a key or keypad entry).

Figure 1B:
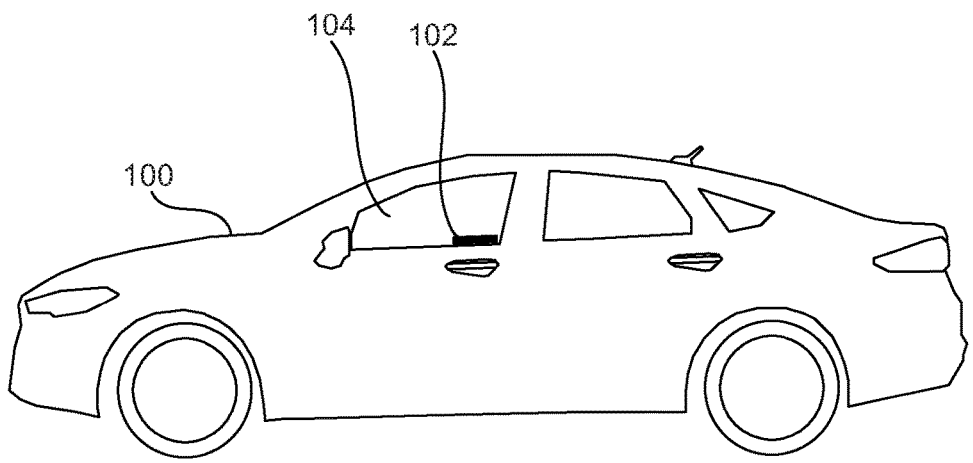

FIGS. 1A and 1B illustrate an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components.

Vehicle 100 may include a UV keypad 102, coupled to a window 104, a windshield, or a rear glass. Vehicle 100 may also include a processor 110. UV Keypad 102 may include UV absorbent or reflective material, such as a paint or dye, positioned between layers of glass or other material that makes up the vehicle window. When the UV keypad is exposed to UV light, it will shine or glow such that a person outside the vehicle can see it. The UV keypad may include numbers, letters, or other text that may make up a pass code or entry code to unlock the vehicle. The UV keypad will be discussed in more detail below with respect to FIGS. 3, 4A and 4B. Vehicle 100 may also include a camera, various LEDs (UV, near infrared (NIR), visible light, etc.), and one or more other components or devices which are discussed in further detail below.

Processor 110 may be configured to carry out one or more functions described herein. For instance, processor 110 may be configured to determine when a person is present outside the vehicle, detect an iris (or face) based on images captured by the camera, determine that one or more keys of the UV keypad have been pressed, and modify one or more vehicle settings, for example. Other actions are possible as well.

Figure 2:
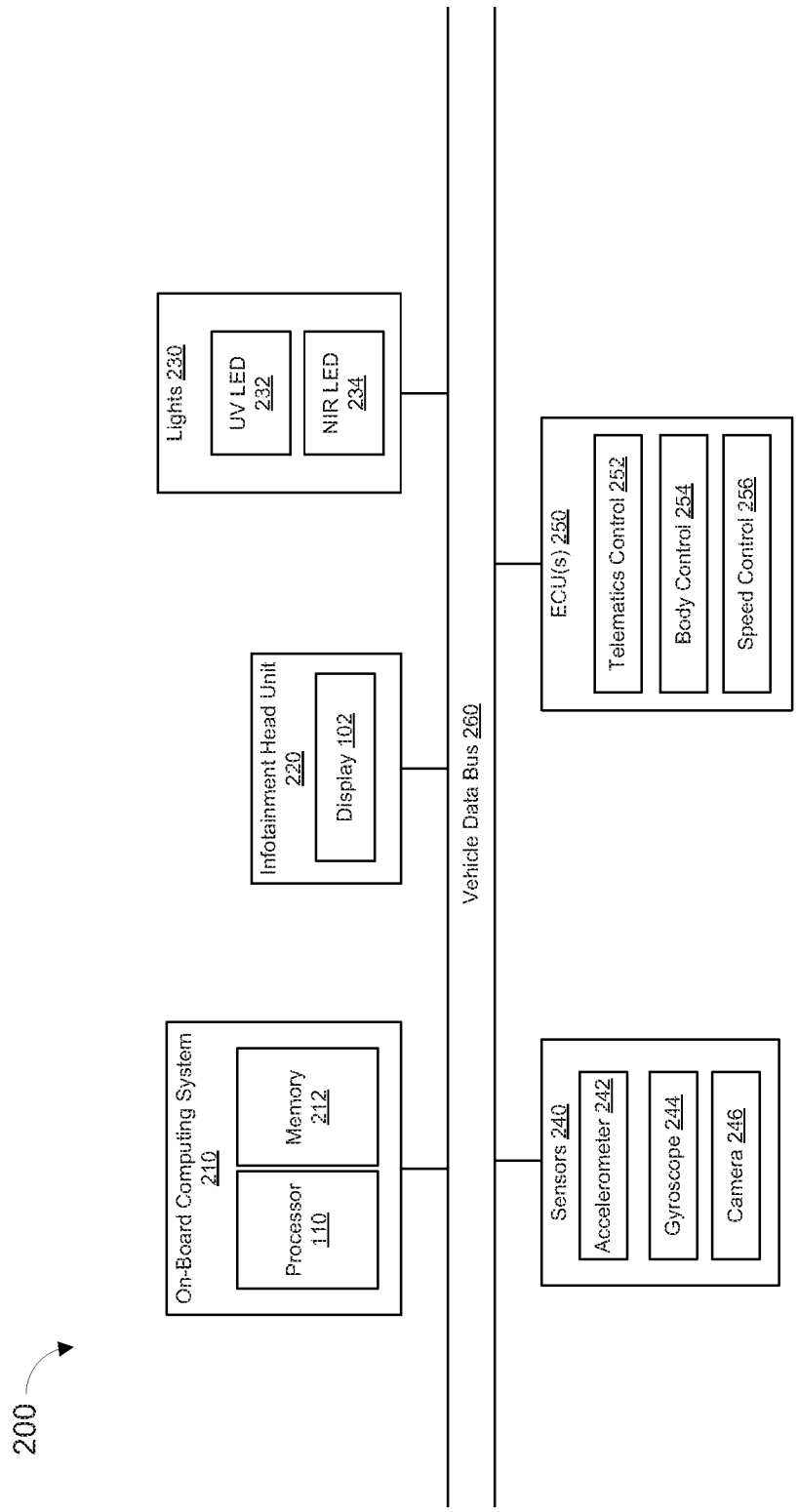
FIG. 2 illustrates a simplified block diagram of electronic components of the vehicle of FIGS. 1A and 1B.

FIG. 2 illustrates an example block diagram 200 showing electronic components of vehicle 100, according to some embodiments. In the illustrated example, the electronic components 200 include an on-board computing system 210, infotainment head unit 220, lights 230, sensors 240, electronic control unit(s) 250, and vehicle data bus 260.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 102. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a center console display of vehicle 100.

Lights 230 may include one or more LEDs or other light emitting devices. For example, lights 230 may include one or more UV LEDs 232 and NIR LEDs 234. The UV LEDs may be configured to illuminate the UV keypad, allowing a person to see the keypad. The keypad may ordinarily be transparent in the absence of UV light from the UV LEDs.

NIR LED 234 may be configured to provide near-infrared light, such that a camera can capture images even in low light settings. The camera (discussed below), may be configured to detect facial features, key presses, and other objects within its field of view. Where there is adequate lighting above a threshold brightness, the camera may use visible light. To capture a key press, the visible light may bounce of a person's finger and be reflected into the camera. Alternatively, where there is not adequate lighting above the threshold brightness, there may not be enough visible light for the camera to operate effectively. In this situation, the NIR LED may provide sufficient light to bounce off the person's finger to be reflected into the camera. The same principle may apply where the camera captures the person's iris.

Sensors 240 may be arranged in and around the vehicle 100 in any suitable fashion, and may be configured to determine one or more characteristics of vehicle 100. For example, accelerometer 242 may measure an acceleration of vehicle 100, gyroscope 244 may measure a pitch, roll, yaw, or other change in vehicle 100, and camera 246 may be configured to capture and transmit images to be processed and/or displayed by vehicle 100. Other sensors may be included as well, such as noise detection sensors, air flow sensors, and more.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit (s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by a GPS receiver, communication module 230, and/or one or more sensors. The body control unit 254 may control various subsystems of the vehicle 100. For example, the body control unit 254 may control power to a trunk latch, windows, power locks, power moon roof control, an immobilizer system, and/or power mirrors, etc. The speed control unit 256 may control the speed of vehicle 100, via control of the brakes, drive train, and/or one or more other systems or devices. Other ECUs are possible as well.

Vehicle data bus 260 may include one or more data buses that communicatively couple the on-board computing system 210, infotainment head unit 220, lights 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7). In some applications, the CAN and CAN-FD may share the same bus.

Figure 3:
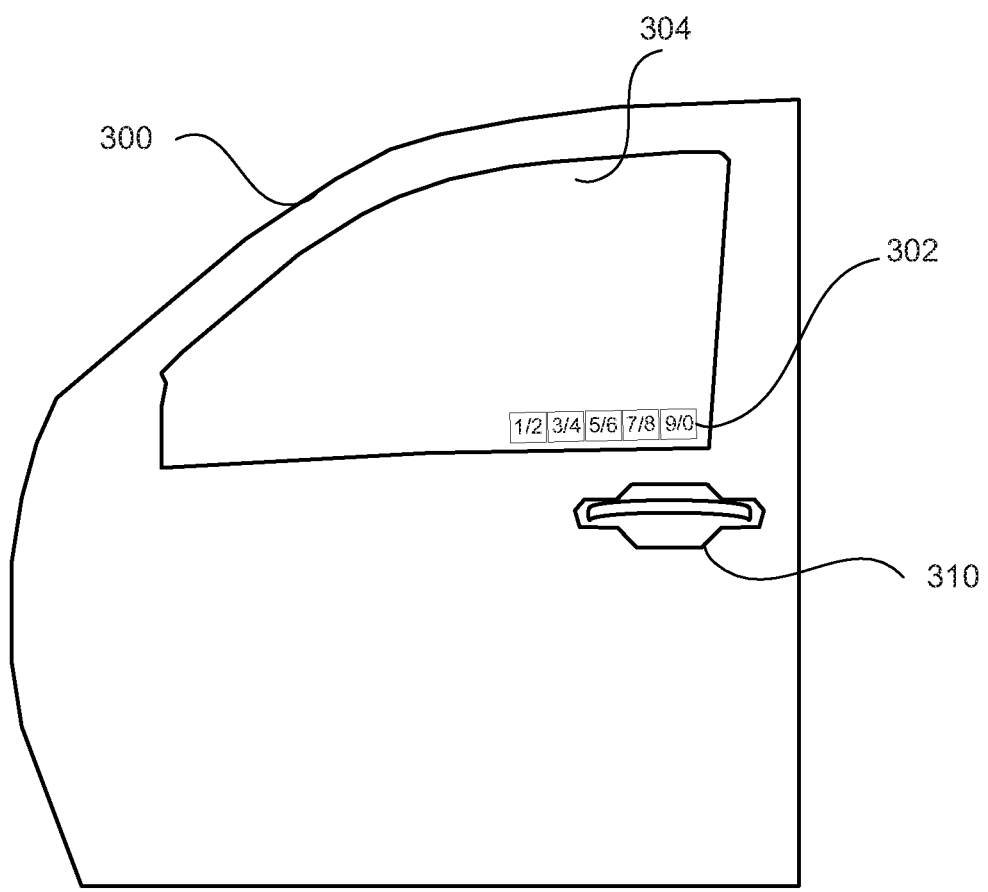
FIG. 3 illustrates an example vehicle door according to embodiments of the present disclosure.

FIG. 3 illustrates a side view of a vehicle door 300 according to embodiments of the present disclosure. The vehicle door may include a window 304, which may include a UV keypad 302. door 300 may also include a handle 310.

FIG. 3 illustrates the UV keypad 302 as comprising 5 separate blocks, each corresponding to a pair of numbers (1 and 2, 3 and 4, etc.). In some examples, the UV keypad may include numbers, letters, a combination of letters and numbers, and/or other text. Further, UV keypad 302 may include more or fewer blocks, such that more or fewer separate inputs may be detected.

In some examples, door 300 and/or door handle 310 may include one or more sensors configured to detect the presence of a person outside the vehicle. This may include, for example, a capacitive or other type of touch sensor, one or more antennas, or more. These sensors may be used by the processor (such as processor 110) to determine when a person is present, in order to responsively activate the UV keypad and/or camera.

Figure 4A:
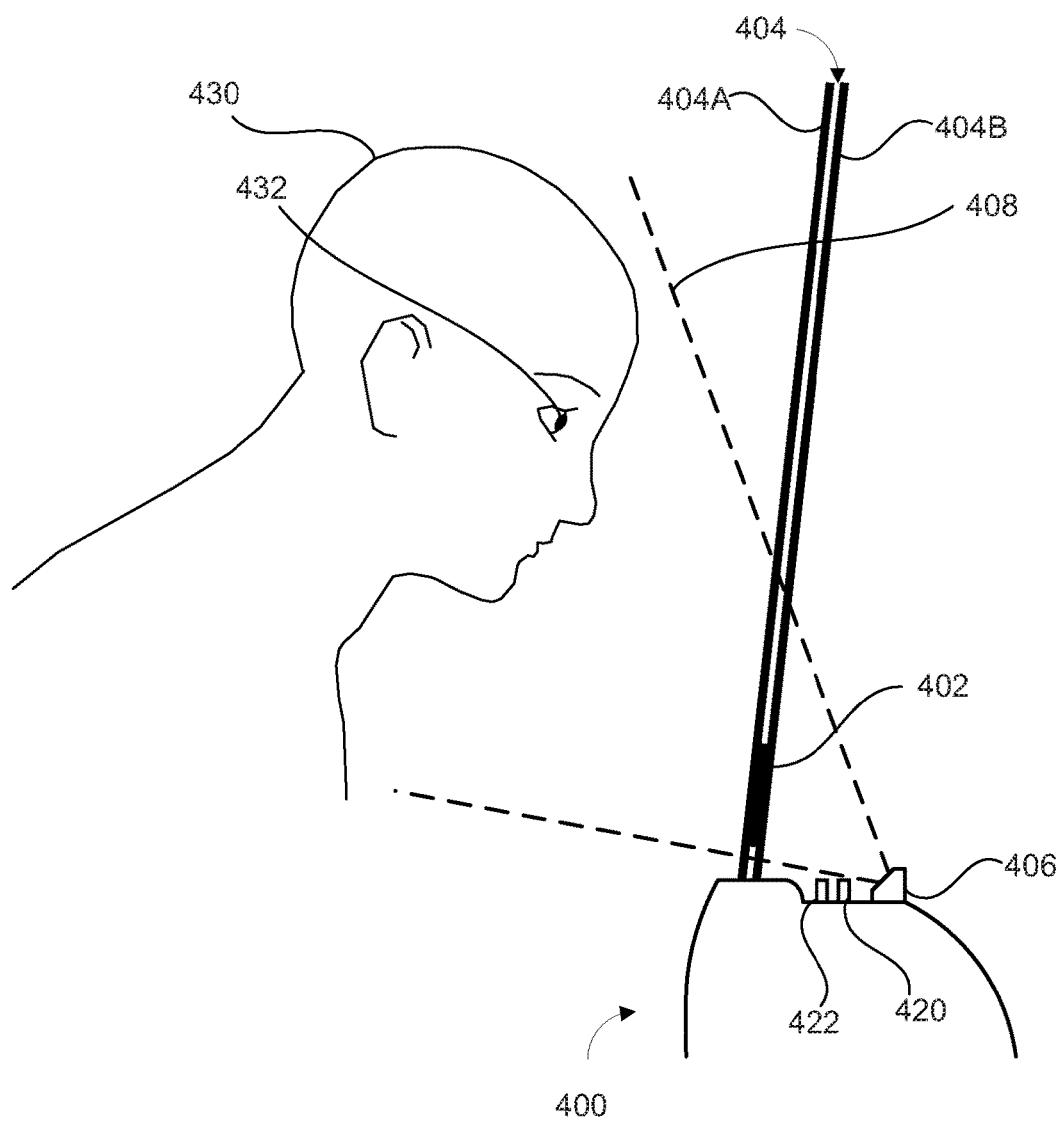
FIGS. 4A and 4B illustrate perspective views of an example vehicle door and window according to embodiments of the present disclosure.
Figure 4B:
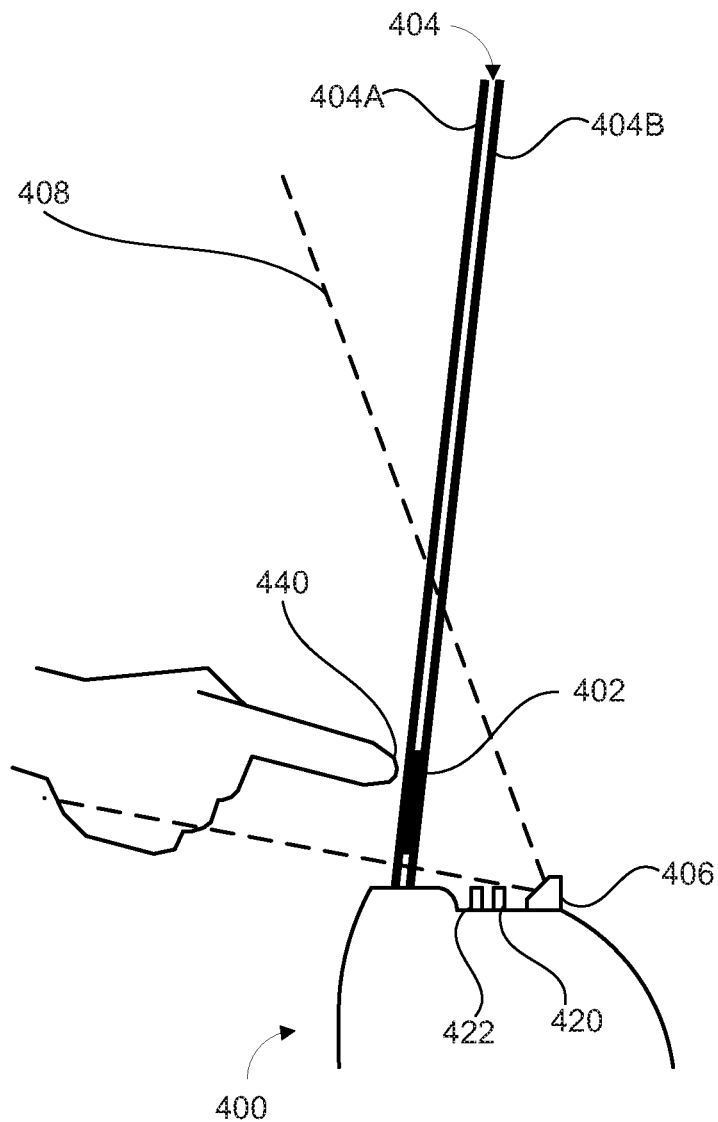

FIGS. 4A and 4B illustrate perspective views of an example vehicle door 400, according to some embodiments. Starting with FIG. 4A, this Figure illustrates a UV keypad 402 integrated with a vehicle window 404. The door 400 also includes a camera 406, a UV LED 420 and an NIR LED 422. The Figure also illustrates a person 430 having an iris 432 within a field of view 408 of the camera.

The UV keypad 402 may comprise a paint, dye, or other material that is sensitive or reactive to UV light. UV Keypad 402 may be integrated with window 404 by being positioned between layers 404A and 404B of the window. Layers 404A and 404B may be specialized glass that, when combined with a film layer between the two glass layers 404A and 404B, prevents UV light from outside the vehicle from affecting the UV Keypad. This may be achieved by having a sun UV blocking layer on the film layer surface adjacent to layer 404A and a UV luminescent ink on the opposite side of the film layer adjacent to layer 404B. Alternatively, one or more other layers or materials may be included within the construction of window 404 such that outside UV light does not illuminate the UV keypad.

Camera 406 may be configured to have a field of view 408 that encompasses the UV keypad 402. The field of view 408 may also be wide enough to encompass a person or part of a person located outside the vehicle. In some examples, camera 406 may include a wide angle lens in order to capture both the UV keypad 402 as well as the person 430. Alternatively, camera 406 may include one or more actuators or moveable elements configured to steer the field of view 408 and/or focal point into capturing either or both of the UV keypad 402 and the person 430.

In some examples, camera 406 may be configured to capture the iris 432 of person 430 located outside the vehicle. The camera 406 may be activated, and/or the iris 432 may be captured by camera 406 in response to a processor determining that person 430 is located in proximity to the vehicle. In practice, this may occur in phases, wherein a first phase includes activating the camera in response to determining the person is located in proximity to the vehicle, and further capturing an image of the person's iris in response to detecting the face of the person. The processor may perform image processing in order to determine that the person's face is located in a proper location to capture an image of the iris, as well as to detect the iris itself from a larger image of the person's face. The proximity detection may include the vehicle detecting a valid keyfob or Phone-as-a-Key (PaaK). Though these devices may be valid keys, they can be shared. Therefore, even in the presence of these valid keys, activation of the camera to biometrically identify the user may allow personalization of vehicle settings to be customized to the user even when multiple users share a keyfob or phone.

In some examples, the iris capturing by camera 406 and/or detection by the processor may be performed in non-ideal lighting conditions. For instance, the vehicle may be located in a dimly lit garage, parking structure, or it may be night time in a dimly lit or unlit location. In these examples, among others, it may be useful to have a separate source of light that will enable the camera to accurately capture the person's iris.

NIR LED 422 may provide near infrared light that is not visible to the human eye. Prior to or upon activation of the camera 406, the processor may be configured to determine a lighting condition surrounding the camera. This lighting condition may be rated on a scale, with the value depending on an amount of light received by the camera. The processor may compare the lighting condition to a reference threshold or value, such that lighting conditions above the threshold include enough light to capture and detect an iris, while lighting conditions below the threshold are not. This threshold may change based on one or more factors, and may be dependent on the image processing software used by the processor. For instance, more advanced image processing software may require less light in an image than less advanced software, while still providing the same confidence in iris detection. As such, the lighting condition threshold may change or be different based on the software used.

Based on the determined lighting condition, the processor may select a light source to be used to detect the iris 432. For example, where the lighting condition is above the threshold, the processor may select visible light as the light source. Alternatively, where the lighting condition is below the threshold, the processor may select the NIR LED as the light source. The selected light source may be used by camera 406 to capture the iris 432.

Once the iris 432 is captured, the processor may perform image processing in order to detect the iris. The detected iris may correspond to one or more profiles of the vehicle. A given vehicle may include multiple drivers, each having his or her own profile and corresponding iris. Each profile may have one or more preselected options, such as seat position, audio presets, and more. Upon detecting iris 432, the processor may compare to a plurality of stored irises to determine whether it matches. Upon determination of a match, the vehicle may automatically change the settings to the values that correspond to the allowed profile. In some examples, rather than iris detection, facial recognition may be performed. As such, it should be understood that the disclosure herein applies to facial recognition as well as iris detection.

FIG. 4B illustrates UV keypad 402 integrated with window 404, and a finger 440 in the process of selecting one of the blocks of UV keypad 402 that is illuminated by light from UV LED 420. Camera 406 may be configured to capture light reflecting off finger 440, such that the processor can process images received by camera 406 and detect the key press.

In some examples, UV LED 420 may be configured to emit light in the direction of UV keypad 420 in response to one or more sensors detecting that a person is present in proximity to the vehicle. Alternatively, UV LED 420 may be configured to emit light in response to the processor determining that a detected iris corresponds to an allowed profile. As such, the UV keypad may only be activated after an iris has been detected.

In some examples, camera 406 may be configured to capture key presses via light reflected off the finger 440 of a person outside the vehicle. The camera may be configured to use visible light, NIR light, or another type of light. Further, the camera 406 and/or processor may be configured to select a light source based on a lighting condition surrounding the camera 406, as described above with respect to detecting iris 432.

Camera 406 may be configured to capture multiple key presses in succession, and the processor may be configured to detect the key presses and determine that a particular pattern has been pressed. In response, the processor may unlock the vehicle.

In some examples, facial recognition may be performed first, followed by keypad entry. The person's face may be captured and recognized, and the processor may associate a unique or personalized key code with the face. And after the facial recognition has been performed, the vehicle may begin modifying one or more vehicle settings (i.e., personalizing the vehicle). In addition, after performing facial recognition, the UV keypad may be made available (i.e., the UV LED turned on, the camera repositioned or angled, etc.). And in response to entry of the personalized key code, the vehicle may be unlocked.

Further, in some examples iris recognition may be performed, and may negate the need for use of the UV keypad for entry. Iris recognition may be accurate enough and secure enough to make a key code entry unnecessary.

Figure 5:
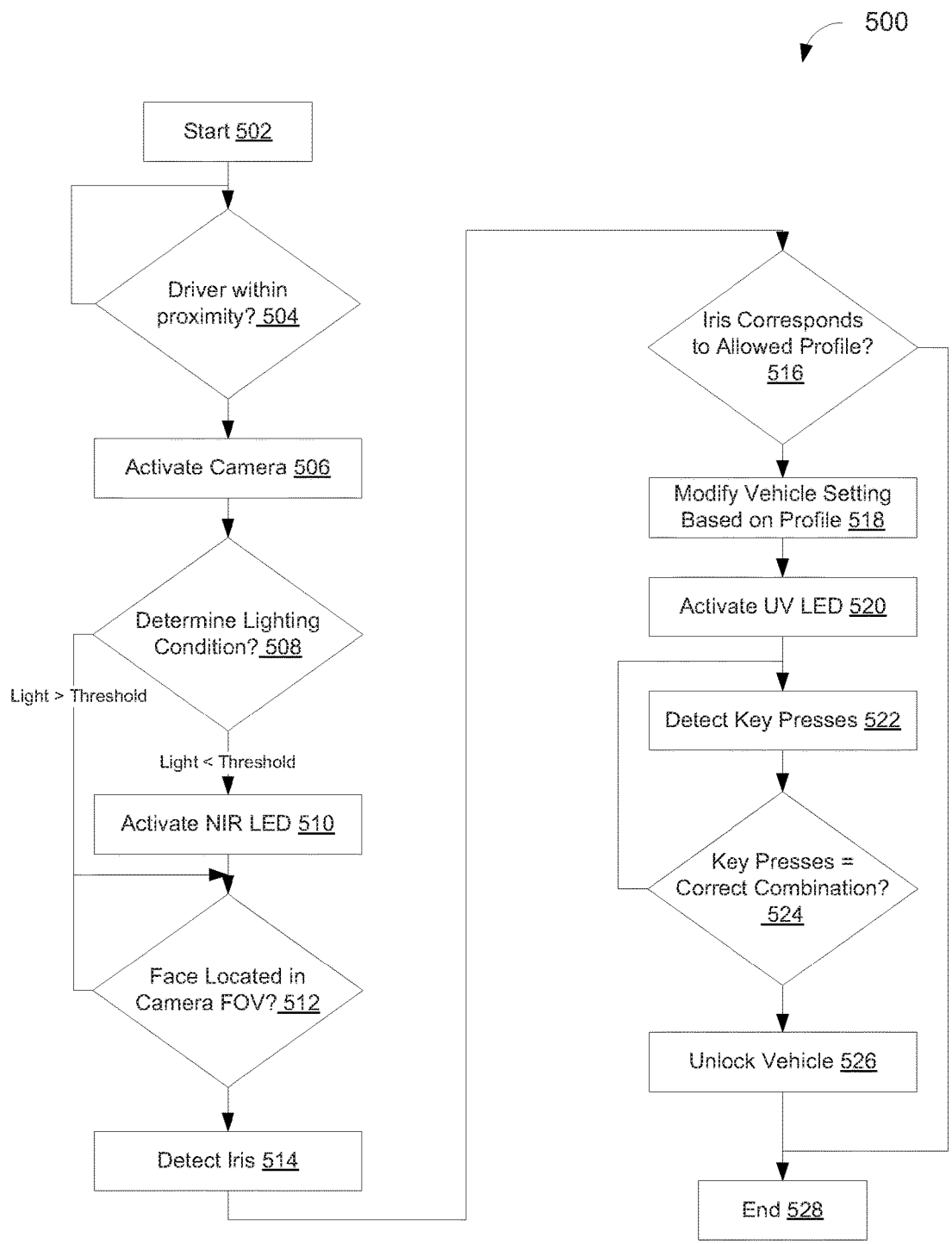
FIG. 5 illustrates a flowchart of an example method according to embodiments of the present disclosure.

FIG. 5 illustrates an example method 500 according to embodiments of the present disclosure. Method 500 may enable a vehicle to use the same camera for both iris detection and UV keypad entry, to unlock and personalize one or more settings of the vehicle. The flowchart of FIG. 5 is representative of machine readable instructions that are stored in memory and may include one or more programs which, when executed by a processor may cause vehicle 100 and/or one or more systems or devices described herein to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1, 2, 3, 4A, and 4B, some functions of those components will not be described in detail below.

Method 500 may start at block 502. At block 504, method 500 may include determining whether a driver is within a proximity of the vehicle. This may include using a sensor on a door handle to detect when a person touches the door handle. Alternatively, the vehicle may include one or more antennas (such as BLUETOOTH or other short range communication) that may be used to determine when a key fob, smart key, or Phone as a Key device is within a predetermined range of the vehicle or driver's side door.

Upon detecting that a person is within proximity of the vehicle, block 506 of method 500 may include activating the camera. This may include turning on the camera, and/or changing a position or angle of the camera such that the camera field of view includes an area outside the driver's side window.

Block 508 of method 500 may include determining a lighting condition surrounding the camera. In some examples, this may include using the camera to detect an amount of light being received. Alternatively, one or more other vehicle sensors (such as ambient light sensors) may be used to determine an amount of light. If the determined level of light is above a threshold level, method 500 may proceed to block 512. But if the level of light is below a threshold level needed to detect an iris, method 500 may proceed to block 510.

Block 510 of method 500 may include activating a NIR LED. This LED may provide light for the camera to capture the face of a person outside the vehicle window. Alternatively, the camera may use visible light, or light from another source.

At block 512, method 500 may include determining whether a face is located in the camera field of view (FOV). This may include performing image processing to detect a face. If no face is located in the FOV, the camera may continue to wait until a face is present. When a face is determined to be present, method 500 may include detecting an iris of the face at block 514.

At block 516, method 500 may include determining whether the detected iris corresponds to an allowed profile. This may include comparing the detected iris to one or more stored irises, each corresponding to one or more allowed profiles. Each allowed profile may correspond to a person who is allowed to drive the vehicle. If the iris does not correspond to an allowed profile, method 500 may end at block 528.

However, if the iris does correspond to an allowed profile, method 500 may include modifying one or more vehicle settings based on the allowed profile at block 518. This may include changing a seat position, audio presets, vehicle mode, and more.

At block 520, method 500 may include activating a UV LED. The UV LED may illuminate the UV keypad positioned in the driver's side window. Method 500 may then include capturing images of the window with the camera, in order to detect key presses on the UV keypad at block 522.

At block 524, method 500 may include determining whether the detected key presses correspond to the correct combination or pass code. If the key presses do not, the system may rest back to block 522 to detect more key presses.

If the key presses are detected in the correct combination, method 500 may include unlocking the vehicle at block 526. In addition, entry of the correct keycode may cause one or more vehicle settings to be customized or modified, without the need for iris or facial recognition. Method 500 may then end at block 528.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment (s) without substantially departing from the spirit and principles of the techniques described herein. All modifications are intended to be included herein within the scope of this disclosure and protected by the following claims.

What is claimed is:

1. A vehicle comprising:
an ultraviolet keypad coupled to a window;
a camera directed at the window, configured to capture a key press of the ultraviolet keypad and an iris of a person outside the vehicle; and
a processor configured to:
responsive to detecting the iris, activate the ultraviolet keypad;
unlock the vehicle based on the detected key press; and
modify a vehicle setting based on a profile corresponding to the detected iris.

2. The vehicle of claim 1, wherein the ultraviolet keypad coupled to the window comprises a layer of ultraviolet reflective material positioned between two layers of glass.

3. The vehicle of claim 1, further comprising an ultraviolet LED configured to illuminate the ultraviolet keypad, wherein capturing the key press comprises capturing light reflected off a user's finger.

4. The vehicle of claim 3, further comprising a near-infrared (NIR) LED, wherein capturing the key press comprises capturing NIR light reflected off the user's finger.

5. The vehicle of claim 1, wherein the processor is further configured to:

determine a lighting condition surrounding the camera; and based on the lighting condition surrounding the camera, select a light source used to detect the iris.

6. The vehicle of claim 5, further comprising a near-infrared (NIR) LED, wherein the processor is further configured to:

determine that the lighting condition surrounding the camera is below a threshold level; and responsively select NIR light as the light source used to detect the iris.

7. The vehicle of claim 5, wherein the processor is further configured to:

determine that the lighting condition surrounding the camera is above a threshold level; and responsively select visible light as the light source used to detect the iris.

8. The vehicle of claim 1, wherein the processor is further configured to:

detect the person in proximity to the window; and responsively activate the camera.

9. The vehicle of claim 1, wherein the camera is coupled to a door of the vehicle.

10. The vehicle of claim 1, wherein the camera is further configured to:

capture the iris; and responsive to the processor determining that the detected iris corresponds to an allowed profile, capture the key press.

11. A method comprising:

capturing, by a camera of a vehicle having a window, an iris of a person outside the window;

responsive to detecting, by a vehicle processor, the iris, activating an ultraviolet keypad coupled to the window;

capturing, by the camera, a key press on the ultraviolet keypad;

unlocking the vehicle based on the detected key press; and modifying a vehicle setting based on a profile corresponding to the detected iris.

12. The method of claim 11, wherein the ultraviolet keypad coupled to the window comprises a layer of ultraviolet reflective material positioned between two layers of glass.

13. The method of claim 11, further comprising an ultraviolet LED configured to illuminate the ultraviolet keypad, wherein capturing the key press comprises capturing light reflected off a user's finger.

14. The method of claim 13, further comprising a near-infrared (NIR) LED, wherein capturing the key press comprises capturing NIR light reflected off the user's finger.

15. The method of claim 11, further comprising:

determining a lighting condition surrounding the camera; and based on the lighting condition surrounding the camera, selecting a light source used to detect the iris.

16. The method of claim 15, further comprising:

determining that the lighting condition surrounding the camera is below a threshold level; and responsively selecting near infrared (NIR) light as the light source used to detect the iris.

17. The vehicle of claim 15, further comprising:

determining that the lighting condition surrounding the camera is above a threshold level; and responsively selecting visible light as the light source used to detect the iris.

18. The method of claim 11, further comprising:

detecting the person in proximity to the window; and responsively activating the camera.

19. The method of claim 11, wherein the camera is coupled to a door of the vehicle.

20. The method of claim 11, further comprising:

prior to capturing the key press; capturing the iris;

determining, by the processor, that the iris corresponds to an allowed profile; and responsively capturing the key press.

* * * * *